United States Patent Office 2,703,383
Patented Mar. 1, 1955

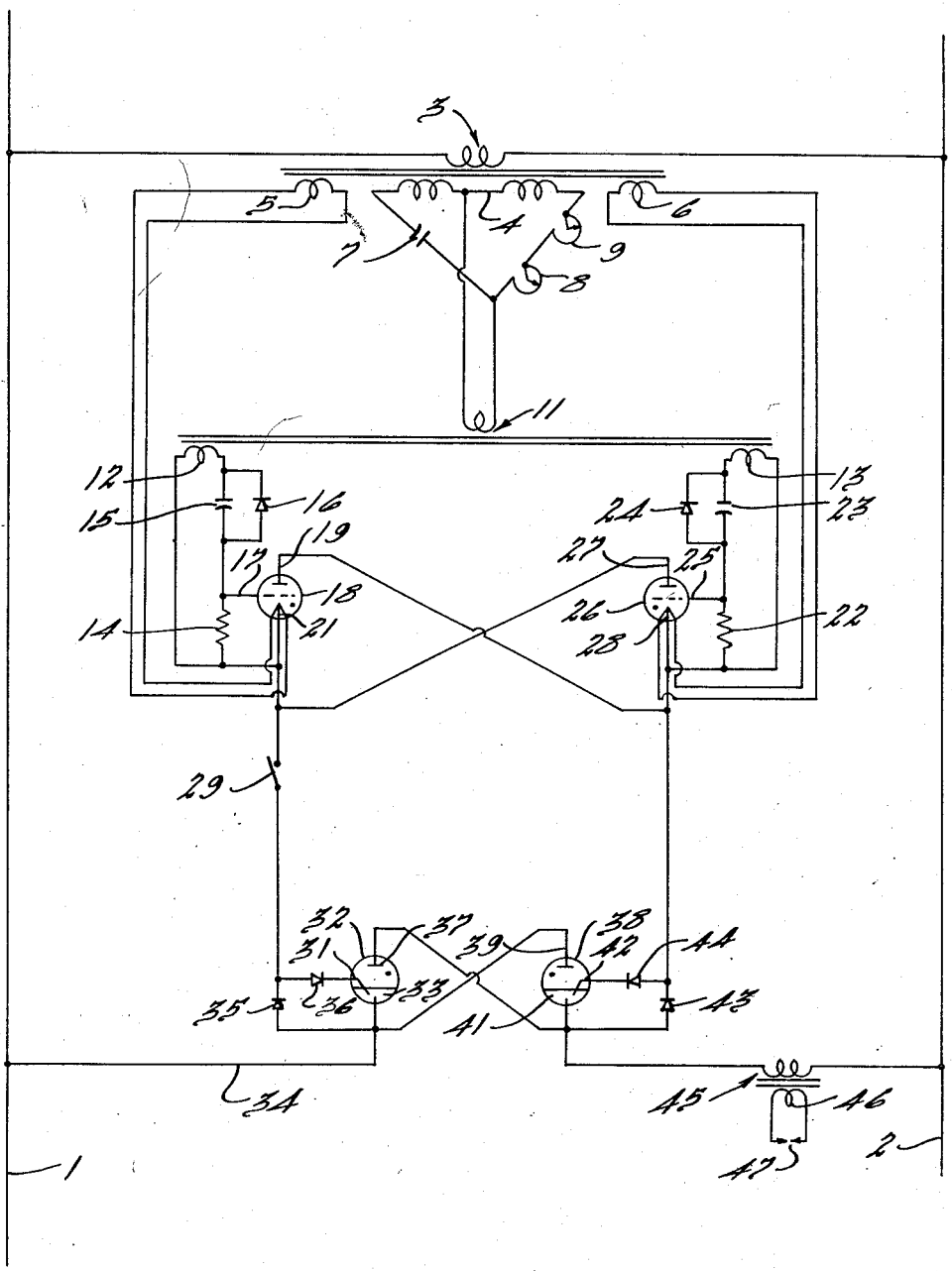

2,703,383

HEAT CONTROL CIRCUIT FOR ELECTRIC WELDING

Ernest G. Anger, Wauwatosa, Wis., assignor to Square D Company, Detroit, Mich., a corporation of Michigan Application January 12, 1951, Serial No. 205,735

8 Claims. (Cl. 323—24)

This invention relates to an improved electronic heat control circuit for use with electronically controlled resistance welding machines.

Controls for resistance welders frequently employ a pair of ignitrons connected in inverse parallel, in which the ignitrons are controlled by heat control tubes connected between the anodes and igniters of the ignitrons. In many earlier heat control circuits, a phase-shifting circuit was provided which supplied a sharp positive grid pulse to the heat control tubes to render these tubes conducting, the phase-shifting circuit being provided with adjustable components to vary the position in any half cycle at which these positive pulses occurred. This type of circuit was subject to the disadvantage that the adjustable components in the phase-shifting circuit could be set so that the positive pulse in the grid circuit of the heat control tubes occurred prior to the "power factor angle"; that is to say, the heat control tubes received a momentary positive grid voltage prior to those moments when the current wave, displaced from the voltage wave in the time-phase by the reactive welder circuit, started a positive pulsation. The result of this phenomenon was the failure of one heat control tube to fire, and therefore a flow of heavy transient currents resulted which frequently caused tripping of the circuit breakers protecting the system.

It is therefore one object of the present invention to provide a grid control circuit for heat control tubes in an electronic control circuit which will always provide positive grid voltage to the heat control tubes after the power factor angle and for an appreciable time so that the heat control tube will not fail to conduct.

Another object of this invention is the provision of a grid circuit for heat control tubes which will always provide positive grid voltage for the heat control tubes after the power factor angle, and which will also cause the positive voltage to be removed from the grids after a predetermined period.

Another object of this invention is the provision of a grid circuit for heat control tubes, in accordance with preceding objects, which will operate in conjunction with a phase-shifting circuit to provide a positive voltage to the grids of the heat control tubes for a predetermined period which is shiftable relative to the anode voltage of the heat control tubes.

Another object of this invention is the grid control circuit in accordance with the preceding object in which the predetermined period is of a duration of approximately one-fourth cycle.

Other objects and features of this invention will be readily apparent to those skilled in the art from the specification and appended drawing illustrating certain preferred embodiments in which the figure is a diagrammatic representation of a welder control circuit incorporating the features of the present invention.

In the figure, the numerals 1 and 2 designate a pair of main supply lines connected to a source of energy which is not shown. Connected across lines 1 and 2 is a transformer 3 having a plurality of secondary windings 4, 5 and 6. The secondary winding 4 of the transformer 3 supplies energy to a phase-shifting circuit comprising a capacitor 7 and a pair of rheostats 8 and 9. Connected to the mid-tap of the secondary winding 4 and to a point between the capacitor 7 and the rheostat 8 is the primary winding of a transformer 11 having secondary windings 12 and 13. Across the secondary winding 12 is connected a series circuit comprising a resistor 14 and a capacitor 15, the capacitor 15 having in parallel therewith a half wave rectifier 16. The resistor 14 is connected to the control grid 17 of an electronic tube 18 having an anode 19 and a cathode 21, the latter element being also connected to the resistor 14 at its opposite side.

Across the secondary winding 13 of transformer 11 there is disposed a series circuit comprising a resistor 22 and a capacitor 23, a rectifier 24 being connected across the capacitor 23. The resistor 22 is connected to a control grid 25 of an electronic tube 26 having an anode 27 and a cathode 28, the latter element also being connected to resistor 22 at its opposite side. It should be noted from the figure that the tubes 18 and 26 are connected in inverse parallel and that the grid circuits for these tubes are identical and are supplied from the same transformer 11. The secondary windings 5 and 6 of the transformer 3 supply electrical energy to heat the cathodes 21 and 28 of tubes 18 and 26 respectively.

Cathode 21 is connected through an initiating contact 29 and through rectifiers 35 and 36 to the mercury cathode 33 and igniter 31 of an ignitron 32, having an anode 37. The cathode 33 is electrically connected to line 1 by a conductor 34.

Connected in inverse parallel with the ignitron 32 is a second ignitron 38 having an anode 39, a mercury cathode 41, and an igniter 42. The cathode 28 of tube 26 is connected to the cathode 41 and igniter 42 through the rectifiers 43 and 44 respectively.

Connected between the lines 1 and 2 through the ignitron tubes 32 and 38 is a welding transformer 45 having a secondary winding 46 across which a pair of welding electrodes 47 are disposed.

In the foregoing description of the circuit, certain conventional elements such as surge bypass capacitors, thermal flow switches, etc. have been eliminated for the purposes of simplicity, their position and operation being well known to those familiar in the art.

The operation of the circuit will now be described. As soon as main supply lines 1 and 2 are connected to a source of electrical energy, the transformer 3 is energized, the secondaries 5 and 6 thereof heating the cathodes of tubes 18 and 26 respectively, the secondary 4 energizing the phase-shifting circuit.

The rheostat 9 had previously been set so that the transformer 11, the primary of which is connected in the phase-shifting circuit, will deliver positive pulsations to its secondary windings no earlier than the phase position of the normal current zero for the particular welding transformer used, the reference being, of course, the main line voltage. The rheostat 8 may be set as desired to cause these positive pulsations to occur later to achieve heat control as desired.

As the secondary 12 begins to drive the control grid 17 of tube 18 positive, secondary 13 begins to drive control grid 25 of tube 26 negative, these transformer voltages being exactly 180° out of phase.

As the secondary 12 begins, at a desired position relative to a half cycle of main line voltage, to drive grid 17 positive, grid current will flow through tube 18 to charge capacitor 15. After the peak of secondary 12 voltage, that is to say after about a quarter cycle, grid current flow through tube 18 ceases due to the charge on capacitor 15, this charge then causing the grid 17 to immediately become negative with respect to cathode 21. Capacitor 15 then begins to discharge through resistor 14. During the following half cycle of negative voltage in secondary 12, current continues to flow through resistor 14 whose value is selected to cause complete discharge of capacitor 15 in this period. At this time the grid 17 resumes the negative potential of secondary 12. Further current through resistor 14, which would otherwise tend to reverse the charge in capacitor 15, is then conducted until the end of the half cycle by rectifier 16.

It will be seen that rectifier 16 prevents the build-up of any reversed charge in capacitor 15, so that when secondary 12 again begins to drive the grid 17 positive, that is to say during the next positive half cycle, the voltage of secondary 12 is not displaced by any D. C. charge upon the capacitor. This ensures that the point at which the grid 17 again begins to go positive is dependent only upon the voltage of secondary 12, which is displaced in phase from the line voltage an amount dependent upon the phase shift circuit.

The operation of the grid circuit of tube 26 is identical with that just described, except occurring with a phase difference of 180° due to the fact that the two transformer secondaries 12 and 13 are, as previously described, exactly 180° out of phase.

Upon closure of the initiating contact 29 when, for example, line 1 is positive, positive voltage appears upon the anodes 27 and 39 of tubes 26 and 38 respectively. At a phase position determined by the setting of the phase shift circuit, secondary 13 will begin to make grid 25 of tube 26 positive with respect to cathode 28 thereof. Tube 26 will thereby begin to conduct, current passing through the rectifier 35, the contact 29, tube 26, rectifier 44 and igniter 42 to cause the ignition of ignitron 38. Welding current will then pass, from line 1 through conductor 34 and ignitron 38, through welding transformers 45 to energize the secondary 46 thereof. Upon cessation of ignitron 38 conduction, which will occur during the following half cycle, the positive voltage of line 2 is applied to the anodes 19 and 37 of tubes 18 and 32 respectively. Then, at a point exactly 180° later in phase than the point at which secondary 13 started to make grid 25 positive, secondary 12 starts to drive grid 17 of tube 18 positive with respect to cathode 21. Tube 18 will then conduct, current passing through rectifier 43, tube 18, contact 29 and igniter 31 to effect conduction of ignitron 32. Weld current will thereupon pass from line 2 through weld transformer 45 and ignitron 32 to line 1. During the next half cycle, ignitron 32 will cease to conduct and the cycle will be repeated, alternate half cycles of weld current continuing to pass though weld transformer 45 until contact 29 is opened.

It will be seen that with the improved circuit of applicant's invention, the grid voltages of the heat control tubes 18 and 26 are maintained in an exact relationship with the anode voltages of those tubes, the grids going positive at a point which is exactly maintained with reference to the anode voltages. Furthermore, the two grid voltages are exactly 180° apart. The precision of the firing point, that is to say the point at which the grids begin to go positive, is thereby maintained regardless of variations in capacitor size, its leakage, grid current leakage, or changes in the amplitude of the A. C. voltage. The period of positive grid voltage is sufficiently long to prevent the failure of the second heat control tube to fire, as occurred in circuits using a peaked positive pulse in which the peak occurred too soon. It is also sufficiently long to prevent the missing of the first heat control tube firing which may occur when the contact 29 is closed by a relay of the type described and claimed in applicant's copending application, Serial No. 148,190 filed March 7, 1950, now Patent No. 2,634,320, for Electric Control Circuit. In addition, by limiting the duration of the period of positive grid voltage to only one-quarter cycle, an abnormally early firing of a succeeding half cycle, which may otherwise occur with extreme phase-back of the grid signal at lowest heat settings and under severe voltage disturbance, is prevented.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit, an electronic tube having an anode, a cathode, and a control grid, means for applying a first alternating voltage between said anode and said cathode, means for applying a second alternating voltage between said cathode and said control grid, a capacitor, means connecting said capacitor between said control grid and said means for applying a second voltage whereby said capacitor is charged by grid rectification of said tube during portions of positive half cycles of said second voltage, a resistor, means for connecting said resistor in series with said capacitor across said means applying a second voltage, said resistor being of a value to remove charge from said capacitor by the end of the half cycles of said second voltage immediately following those half cycles in which said capacitor is charged, and means for preventing the charging of said capacitor during said following half cycles.

2. In a control circuit, an electronic tube having an anode, a cathode, and a control grid, means for applying a first alternating voltage between said anode and said cathode, means for applying a second alternating voltage between said cathode and said control grid, a capacitor, means connecting said capacitor between said control grid and said means for applying a second voltage whereby said capacitor is charged by grid rectification of said tube during portions of positive half cycles of said second voltage, a resistor, means for connecting said resistor in series with said capacitor across said means applying a second voltage, said resistor being of a value to remove the charge from said capacitor by the end of the negative half cycles of said second voltage, and a rectifier in parallel with said capacitor for preventing any charge thereof during said negative half cycles.

3. In a control circuit, an electronic tube having an anode, a cathode, and a control grid, means for applying a first alternating voltage between said anode and said cathode, means for applying a second alternating voltage between said cathode and said control grid, a capacitor, means connecting said capacitor between said control grid and said means for applying a second voltage whereby said capacitor is charged by grid rectification of said tube during portions of positive half cycles of said second voltage, the charge on said capacitor rendering said control grid negative with respect to said cathode during the remaining portions of the positive half cycles of said second voltage, a resistor, means for connecting said resistor in series with said capacitor across said means applying a second voltage, said resistor being of a value to remove the charge from said capacitor by the end of the negative half cycles of said second voltage, and a rectifier in parallel with said capacitor for preventing any charge thereof during said negative half cycles.

4. In a control circuit for electronic welders, a pair of electronic tubes connected in inverse parallel and each having an anode, a cathode, and a control grid, means for applying a first alternating voltage between said anodes and cathodes, a transformer having a pair of secondary windings, means for connecting one of said secondary windings between the cathode and control grid of one of said tubes whereby an alternating voltage is applied therebetween, means for connecting the other of said secondary windings between the cathode and control grid of the other of said tubes whereby an alternating voltage which is 180° out of phase with said first mentioned grid voltage is applied therebetween, means for making said control grids negative with respect to said cathodes after a predetermined period in those half cycles of secondary voltage during which said secondaries tend to make said control grids positive with respect to said cathodes, and means for eliminating any effect of said last mentioned means prior to the ends of those half cycles during which said secondaries tend to make said control grids negative with respect to said cathodes, and means responsive to energization of said tubes for passing current to a load.

5. In a control circuit, an electronic tube having a pair of principal electrodes and a control electrode, means for applying a first alternating voltage between said principal electrodes, means for applying a second alternating voltage between one of said principal electrodes and said control electrode, a capacitor, means connecting said capacitor between said control electrode and said means for applying a second voltage whereby said capacitor is charged by rectification within said tube during portions of positive half cycles of said second voltage, a resistor, means for connecting said resistor in series with said capacitor across said means applying a second voltage, said resistor being of a value to remove the charge from said capacitor by the end of the half cycles of said second voltage immediately following those half cycles in which said capacitor is charged, and means for preventing the charging of said capacitor during said following half cycles.

6. In a control circuit for electronic welders, a pair of electronic tubes connected in inverse parallel and each having an anode, a cathode, and a control grid, means for applying an alternating voltage between said anodes and cathodes, a transformer having a pair of secondary windings, means for connecting one of said secondary windings between the cathode and control grid of one of said tubes whereby an alternating voltage is applied therebetween, means for connecting the other of said secondary windings between the cathode and control grid of the other of said tubes whereby an alternating voltage which is 180 degrees out of phase with said first mentioned grid voltage is applied therebetween, a capacitor in the grid circuit of each of said tubes, means connecting said capacitors between said control grids and said secondary windings whereby said capacitors are charged by grid rectification of said tubes during portions of positive half cycles of the secondary voltage, a resistor for each tube, means connecting said resistors in series with said capacitors across said secondary windings, said resistors being of a value to remove the charges from said capacitors by the end of the half cycles of said secondary voltages immediately following those half cycles in which said capacitors are charged, and means for preventing the charging of said capacitors during said following half cycles.

7. In a control circuit for electronic welders, a pair of electronic tubes connected in inverse parallel and each having an anode, a cathode, and a control grid, means for applying an alternating voltage between said anode and cathode, a transformer having a pair of secondary windings, means for connecting one of said secondary windings between the cathode and control grid of one of said tubes whereby an alternating voltage is applied therebetween, means for connecting the other said secondary windings between the cathode and control grid of the other of said tubes whereby alternating voltage which is 180 degrees out of phase with said first mentioned grid voltage is applied therebetween, a capacitor in the grid circuit of each of said tubes, means connecting said capacitors between said control grids and said secondary windings whereby said capacitors are charged by grid rectification of said tubes during portions of positive half cycles of the secondary voltages, a resistor for each tube, means connecting said resistors in series with said capacitors across said secondary windings, said resistors being of a value to remove substantially all charge from said capacitors by the end of the half cycles of said secondary voltages immediately following those half cycles in which said capacitors are charged, means for preventing the charging of said capacitors during said following half cycles, and means for shifting the phase of the voltages applied by said secondary windings relative to the voltage applied to said anodes and cathodes.

8. In a control circuit, an electronic tube having a pair of principal electrodes and a control electrode, means for applying a first alternating voltage between said principal electrodes, means for applying a second alternating voltage between one of said principal electrodes and said control electrode, a capacitor, means connecting said capacitor between said control electrode and said means for applying a second voltage whereby said capacitor is charged by rectification within said tube during portions of positive half cycles of said second voltage, a resistor, means for connecting said resistor in series with said capacitor across said means applying a second voltage, said resistor being of a value to remove the charge from said capacitor by the end of the half cycles of said second voltage immediately following those half cycles in which said capacitor is charged, means for preventing the charging of said capacitor during said following half cycles, and means for shifting the phase of said second alternating voltage relative to that of said first alternating voltage.

References Cited in the file of this patent

UNITED STATES PATENTS

| | | |
|---|---|---|
| 2,306,791 | Moe | Dec. 29, 1942 |
| 2,428,592 | Stadum | Oct. 7, 1947 |
| 2,466,022 | Gorton | Apr. 5, 1949 |
| 2,511,628 | Elliot | June 13, 1950 |